(12) United States Patent
McDaniel et al.

(10) Patent No.: US 7,884,165 B2
(45) Date of Patent: Feb. 8, 2011

(54) HALF-METALLOCENE CATALYST COMPOSITIONS AND THEIR POLYMER PRODUCTS

(75) Inventors: Max P. McDaniel, Bartlesville, OK (US); Matthew G. Thorn, Lebanon, OH (US); Elizabeth A. Benham, Spring, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 298 days.

(21) Appl. No.: 12/172,805

(22) Filed: Jul. 14, 2008

(65) Prior Publication Data

US 2010/0010174 A1    Jan. 14, 2010

(51) Int. Cl.
*C08F 4/02* (2006.01)
*C08F 4/642* (2006.01)
*C08F 4/6592* (2006.01)
*B01J 31/22* (2006.01)

(52) U.S. Cl. ............... 526/161; 526/129; 526/160; 526/348; 526/348.2; 526/943; 502/103; 502/120; 502/152; 502/155

(58) Field of Classification Search ............... 502/103, 502/120, 152, 155; 526/129, 160, 161, 348, 526/348.2, 943

See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 4,060,480 A | 11/1977 | Reed |
| 4,452,910 A | 6/1984 | Hopkins |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn |
| 4,871,705 A | 10/1989 | Hoel |
| 4,939,217 A | 7/1990 | Stickler |
| 5,332,706 A | 7/1994 | Nowlin et al. |
| 5,352,749 A | 10/1994 | DeChellis et al. |
| 5,376,611 A | 12/1994 | Shveima |
| 5,436,304 A | 7/1995 | Griffin et al. |
| 5,455,314 A | 10/1995 | Burns et al. |
| 5,539,076 A | 7/1996 | Nowlin et al. |
| 5,556,821 A | 9/1996 | Aida et al. |
| 5,565,175 A | 10/1996 | Hottovy et al. |
| 5,575,979 A | 11/1996 | Hanson |
| 5,576,259 A | 11/1996 | Hasegawa |
| 5,635,573 A | 6/1997 | Harrington et al. |
| 5,698,651 A | 12/1997 | Kawasaki et al. |
| 5,747,405 A | 5/1998 | Little et al. |
| 5,807,938 A | 9/1998 | Kaneko |
| 5,861,352 A | 1/1999 | Gila et al. ............... 502/155 |
| 5,906,955 A | 5/1999 | Hamura |
| 5,919,983 A | 7/1999 | Rosen |
| 5,942,459 A | 8/1999 | Sugano et al. |
| 5,962,362 A | 10/1999 | Wasserman et al. |
| 6,107,230 A | 8/2000 | McDaniel et al. |
| 6,127,302 A | 10/2000 | Wasserman ............... 502/122 |
| 6,159,889 A | 12/2000 | Wasserman ............... 502/125 |
| 6,165,929 A | 12/2000 | McDaniel et al. |
| 6,239,235 B1 | 5/2001 | Hottovy et al. |
| 6,242,622 B1 | 6/2001 | Oda et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,340,652 B1 | 1/2002 | Sugano et al. |
| 6,355,594 B1 | 3/2002 | McDaniel et al. |
| 6,376,415 B1 | 4/2002 | McDaniel et al. ........ 502/113 |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,410,657 B1 | 6/2002 | Ko et al. |
| 6,469,117 B1 | 10/2002 | Kuang et al. |
| 6,524,987 B1 | 2/2003 | Collins et al. |
| 6,528,448 B1 | 3/2003 | Jensen et al. |
| 6,531,550 B1 | 3/2003 | McDaniel et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,825,369 B1 | 11/2004 | Stevens et al. |

(Continued)

FOREIGN PATENT DOCUMENTS

EP    0 989 139 A1    3/2000

(Continued)

OTHER PUBLICATIONS

Search Report for International Application No. PCT/US2009/004047, mailed Dec. 10, 2009.

(Continued)

*Primary Examiner*—Caixia Lu
(74) *Attorney, Agent, or Firm*—Merchant & Gould, P.C.

(57) ABSTRACT

The present invention provides polymerization catalyst compositions employing half-metallocene compounds with a heteroatom-containing ligand bound to the transition metal. Methods for making these hybrid metallocene compounds and for using such compounds in catalyst compositions for the polymerization and copolymerization of olefins are also provided.

24 Claims, 4 Drawing Sheets

U.S. PATENT DOCUMENTS

| | | | |
|---|---|---|---|
| 6,833,415 | B2 | 12/2004 | Kendrick et al. |
| 6,982,306 | B2 | 1/2006 | Martin et al. ............... 526/166 |
| 7,226,886 | B2 | 6/2007 | Jayaratne et al. ............ 502/129 |
| 7,294,599 | B2 | 11/2007 | Jensen et al. |
| 7,390,764 | B2 | 6/2008 | McDaniel et al. |
| 7,417,097 | B2 | 8/2008 | Yu et al. |
| 2005/0113243 | A1 | 5/2005 | Thorn et al. ............... 502/117 |

FOREIGN PATENT DOCUMENTS

| | | |
|---|---|---|
| EP | 1 102 795 A1 | 5/2001 |
| WO | WO 2004/018489 A1 | 3/2004 |

OTHER PUBLICATIONS

Arevalo, Silvia, et al. *Ethylene polymerization behavior of monometallic complexes and metallodendrimers based on cyclopentadienyl-aryloxy titanium units*, Journal of Organometallic Chemistry 690 (2005) 4620-4627.

Antinolo, A., et al. *Synthesis of Zirconium(IV) Monocyclopentadienyl-Aryloxy Complexes and Their Use in Catalytic Ethylene Polymerization. X-ray Structure of* $(\eta^5-C_5Me_5)Zr\{2,6-OC_6H_3(CH_3)_2\}_3$, Organometallics 2000, 19, 2837-2843.

Thom, Matthew G., et al., *Synthesis, Characterization, and One-Election Reduction of Mixed-Cyclopentadienyl/Aryloxide Titanium Dichlorides*, Organometallics 2000, 19, 5636-5642.

Arevalo, Silvia, et al.,*Synthesis of Aryloxo Cyclopentadienyl Group 4 Metal-Containing Dendrimers*, Organometallics 2003, 22, 5109-5113.

Nicholas, et al., "Synthesis, Spectroscopy, and Catalytic Properties of Cationic Organozirconium Adsorbates on "Super Acidic" Sulfated Alumina. "Single-Site" Heterogeneous Catalysts with Virtually 100% Active Sites," J. Am. Chem. Society, (2003) 125, pp. 4325-4331.

Nicholas, et al. "Zirconium Hydrocarbyl Chemisorption on Sulfated Metal Oxides: New Supports, Chemisorption Pathways, and Implications for Catalysis," Langmuir, (2004) 20, pp. 9456-9462.

Byun et al., "Effect of Cyclopentadienyl and Anionic Ancillary Ligand in Syndiospecific Styrene Polymerization Catalyzed by Nonbridged Half-Titanocenes Containing Aryloxo, Amide, and Anilide Ligands: Cocatalyst Systems," Macromolecules 2004, vol. 37, pp. 5520-5530.

Fenwick et al., "Formation of Neutral and Cationic Methyl Derivatives of Titanium Containing Cyclopentadienyl and Aryloxide Ancillary Ligation," Organometallics 2004, vol. 23, pp. 2146-2156.

Itagaki et al., "Ethylene polymerization and ethylene/1-octene copolymerization using group 4 half-metallocenes containing aryloxo ligands, Cp*MCl$_2$(Oar)-MAO catalyst systems," Journal of Molecular Catalysis A: Chemical 2009, vol. 303, pp. 102-109.

Nomura et al., "Effect of aryloxide ligand in 1-hexene, styrene polymerization catalyzed by nonbridged half-titanocenes of the type . . . ," Journal of Molecular Catalysis A: Chemical 2006, vol. 254, pp. 197-205.

Manz et al., "Supporting Information Part 1: Experimental Details, Kinetic Analysis, and Model Optimization," J. Am. Chem. Soc. 2007, vol. 129, pp. 3776-3777.

Nomura et al., "Ethylene/$\alpha$-olefin copolymerization by various nonbridged (cyclopentadienyl)(aryloxy)titanium(IV) complexes—MAO catalyst system," Journal of Molecular Catalysis A: Chemical 2001, vol. 174, pp. 127-140.

Phomphrai et al., "Diverse Pathways of Activation and Deactivation of Half-Sandwich Aryloxide Titanium Polymerization Catalysts," Organometallic 2006, vol. 25, pp. 214-220.

Nomura et al., "Syndiospecific Styrene Polymerization and Efficient Ethylene/Styrene Copolymerization Catalyzed by (Cyclopentadienyl)(aryloxy)titanium(IV) complexes—MAO System," Macromolecules 2000, vol. 33, pp. 8122-8124.

Scholz et al., "Benzylverbindungen elektronenarmer Übergangsmetalle . . . ," Journal of Organometallic Chemistry 1993, vol. 443, pp. 93-99.

Thorn et al., "Synthesis, structure and molecular dynamics of $\eta^2$—iminoacyl . . . ," Journal of the Chemical Society, Dalton Transactions 2002, vol. 17, pp. 3398-3405.

Pinnavaia, "Intercalated Clay Catalysts," Science 1983, vol. 220, No. 4595, pp. 365-371.

Thomas et al., "Sheet Silicate Intercalates: New Agents for Unusual Chemical Conversions*," Intercalation Chemistry (S. Whittington) 1972, Ch.3, pp. 55-99.

Li, et al., Coordination Copolymerization of Severely Encumbered Isoalkenes with Ethylene: Enhanced Enchainment Mediated by Binuclear Catalysts and Cocatalysts, JACS Articles, 2005, 127, 14756-14768.

Hieber et al., "Some correlations involving the shear viscosity of polystyrene melts," Rheologica Acta 28 (1989), pp. 321-332.

Hieber et al., "Shear-Rate-Dependence Modeling of Polymer Melt Viscosity," Polymer Engineering and Science 1992, vol. 32, No. 14, pp. 931-938.

Bird et al., "Dynamics of Polymeric Liquids," vol. 1, Fluid Mechanics, 2nd Edition, John Wiley & Sons (1987), 3 pages.

HALF-METALLOCENE CATALYST COMPOSITIONS AND THEIR POLYMER PRODUCTS

BACKGROUND OF THE INVENTION

The present invention relates generally to the field of olefin polymerization catalysis, catalyst compositions, methods for the polymerization and copolymerization of olefins, and polyolefins. More specifically, this invention relates to half-metallocene compounds with a heteroatom-containing ligand bound to the transition metal, and catalyst compositions employing such hybrid compounds.

Polyolefins such as high density polyethylene (HDPE) homopolymer and linear low density polyethylene (LLDPE) copolymer can be produced using various combinations of catalyst systems and polymerization processes. One method that can be used to produce such polyolefins employs a chromium-based catalyst system. HDPE and LLDPE resins produced using a chromium-based catalyst system generally have a broad molecular weight distribution. For instance, resins having a polydispersity index (PDI) greater than 6 are not unusual. Polyolefin resins produced using a chromium catalyst also can have a low level of long chain branching. This combination of properties is difficult to duplicate with other commercially viable catalyst systems. Metallocene catalysts, for example, generally produce polyolefins with a much narrower molecular weight distribution and either have too little, or too much, long chain branching. Likewise, Ziegler-type catalyst systems produce polyolefin resins which are typically much narrower in molecular weight distribution and have substantially no long chain branching. Polyolefin resins produced using a ballard catalyst are generally too high in molecular weight, too broad in molecular weight distribution, and contain too much long chain branching.

It would be beneficial to have a non-chromium catalyst system that could produce a polyolefin homopolymer or copolymer having the desired combination of a relatively broad molecular weight distribution and a relatively low level of long chain branching. Accordingly, it is to this end that the present invention is directed.

SUMMARY OF THE INVENTION

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to half-metallocene compounds with a heteroatom-containing ligand bound to the transition metal, and catalyst compositions employing such hybrid metallocene compounds. Catalyst compositions of the present invention which contain these hybrid metallocene compounds can be used to produce, for example, ethylene-based homopolymers and copolymers.

The present invention discloses novel hybrid metallocene compounds having a metallocene moiety and a heteroatom-containing ligand. According to one aspect of the present invention, these unbridged hybrid metallocene compounds have the formula:

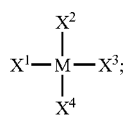

(I)

wherein:

M is Zr, Hf, or Ti;

$X^1$ and $X^2$ independently are a halide or a substituted or unsubstituted aliphatic, aromatic, or cyclic group, or a combination thereof;

$X^3$ is a substituted or unsubstituted cyclopentadienyl, indenyl, or fluorenyl group, any substituents on $X^3$ independently are a hydrogen atom or a substituted or unsubstituted aliphatic, aromatic, or cyclic group, or a combination thereof;

$X^4$ is —O—$R^A$, —NH—$R^A$, —PH—$R^A$, —S—$R^A$, or —$CR^B$=$NR^C$, wherein:

$R^A$ is an aryl group substituted with at least one alkenyl substituent, any substituents on $R^A$ other than the at least one alkenyl substituent independently are a hydrogen atom or a substituted or unsubstituted alkyl, alkenyl, or alkoxy group; and $R^B$ and $R^C$ independently are a hydrogen atom or a substituted or unsubstituted aliphatic, aromatic, or cyclic group, or a combination thereof.

Catalyst compositions containing these unbridged hybrid metallocene compounds are also provided by the present invention. In one aspect, a catalyst composition is disclosed which comprises a contact product of at least one hybrid metallocene compound and at least one activator. This catalyst composition can further comprise at least one organoaluminum compound. The at least one activator can be at least one activator-support, at least one aluminoxane compound, at least one organoboron or organoborate compound, at least one ionizing ionic compound, or combinations thereof.

In another aspect, a catalyst composition comprising a contact product of at least one hybrid metallocene compound and at least one activator is provided. In this aspect, the at least one hybrid metallocene compound is:

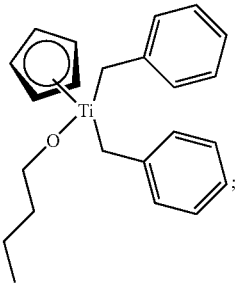

;

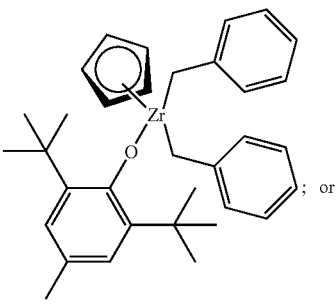

; or

Indenyl($X^4$)Zr(CH$_2$Ph)$_2$; wherein $X^4$ is

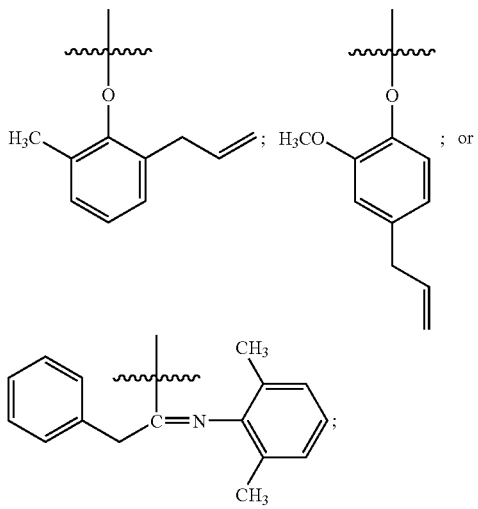

and Ph is an abbreviation for phenyl. This catalyst composition can further comprise at least one organoaluminum compound, and the at least one activator can be at least one activator-support, at least one aluminoxane compound, at least one organoboron or organoborate compound, at least one ionizing ionic compound, or combinations thereof.

The present invention also contemplates a process for polymerizing olefins in the presence of a catalyst composition, the process comprising contacting the catalyst composition with at least one olefin monomer and optionally at least one olefin comonomer under polymerization conditions to produce a polymer or copolymer. The catalyst composition can comprise a contact product of at least one hybrid metallocene compound and at least one activator. Optionally, organoaluminum compounds can be employed in this process. The at least one activator can be at least one activator-support, at least one aluminoxane compound, at least one organoboron or organoborate compound, at least one ionizing ionic compound, or a combination thereof.

Polymers produced from the polymerization of olefins, resulting in either homopolymers or copolymers, can be used to produce various articles of manufacture.

DEFINITIONS

Figure 1:
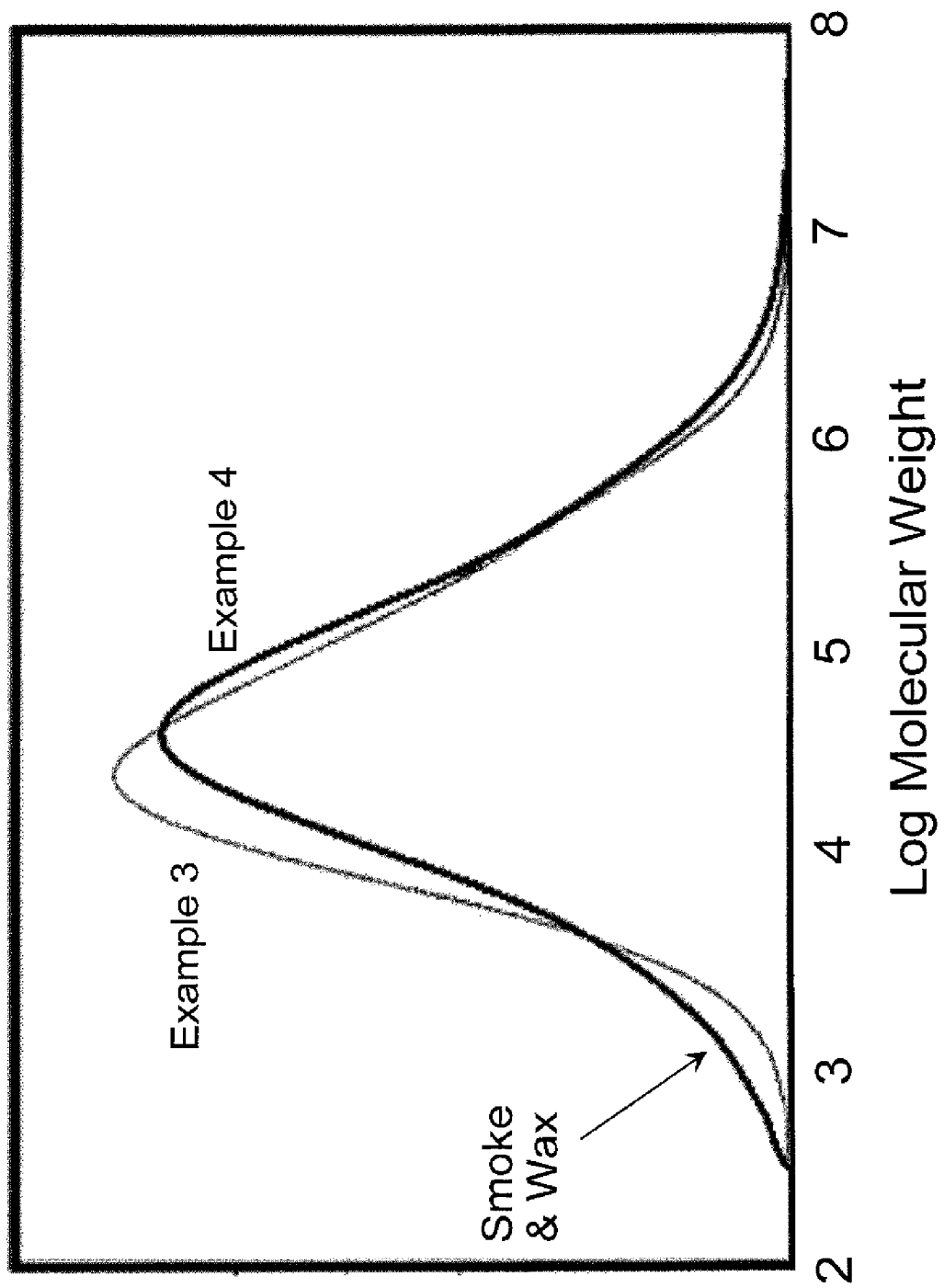
FIG. 1 presents a plot of the molecular weight distributions of the polymers of Example 3 and Example 4.

To define more clearly the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and copolymers of ethylene and a comonomer. "Polymer" is also used herein to mean homopolymers and copolymers of any olefin monomer disclosed herein (e.g., propylene).

The term "co-catalyst" is used generally herein to refer to organoaluminum compounds that can constitute one component of a catalyst composition. Additionally, "co-catalyst" can refer to other components of a catalyst composition including, but not limited to, aluminoxanes, organoboron or organoborate compounds, ionizing ionic compounds, as disclosed herein. The term "co-catalyst" is used regardless of the actual function of the compound or any chemical mechanism by which the compound may operate. In one aspect of this invention, the term "co-catalyst" is used to distinguish that component of the catalyst composition from the hybrid metallocene compound.

The term "fluoroorgano boron compound" is used herein with its ordinary meaning to refer to neutral compounds of the form BY$_3$. The term "fluoroorgano borate compound" also has its usual meaning to refer to the monoanionic salts of a fluoroorgano boron compound of the form [cation]$^+$[BY$_4$]$^-$, where Y represents a fluorinated organic group. Materials of these types are generally and collectively referred to as "organoboron or organoborate compounds."

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another.

The term "precontacted" mixture is used herein to describe a first mixture of catalyst components that are contacted for a first period of time prior to the first mixture being used to form a "postcontacted" or second mixture of catalyst components that are contacted for a second period of time. Often, the precontacted mixture describes a mixture of metallocene compound (or compounds), olefin monomer, and organoaluminum compound (or compounds), before this mixture is contacted with an activator-support and optional additional organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Alternatively, the precontacted mixture can describe a mixture of metallocene compound, olefin monomer, and activator-support, before this mixture is contacted with an organoaluminum co-catalyst.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound, olefin monomer, organoaluminum compound, and activator-support (e.g., chemically-treated solid oxide), formed from contacting the precontacted mixture of a portion of these components with any additional components added to make up the postcontacted mixture. For instance, the additional component added to make up the postcontacted mixture can be a chemically-treated solid oxide, and, optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

The term "hybrid metallocene," as used herein, describes an unbridged half-metallocene compound with a heteroatom-containing ligand bound to the transition metal. The hybrid metallocenes of this invention contain one $\eta^3$ to $\eta^5$-cyclopentadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the hybrid metallocene is referred to simply as the "catalyst," in much the same way the term "co-catalyst" is used herein to refer to, for example, an organoaluminum compound. Unless otherwise specified, the following abbreviations are used: Cp for cyclopentadienyl; Ind for indenyl; and Flu for fluorenyl.

The terms "catalyst composition," "catalyst mixture," "catalyst system," and the like, do not depend upon the actual product resulting from the contact or reaction of the components of the mixtures, the nature of the active catalytic site, or the fate of the co-catalyst, the hybrid metallocene compound, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

The term "hydrocarbyl" is used herein to specify a hydrocarbon radical group that includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms "chemically-treated solid oxide," "solid oxide activator-support," "treated solid oxide compound," and the like, are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises a calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition. The activator-support of the present invention can be a chemically-treated solid oxide.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any structure presented also encompasses all conformational isomers, regioisomers, and stereoisomers that may arise from a particular set of substituents. The structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of integers, a range of weight ratios, a range of molar ratios, a range of temperatures, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is an aliphatic group having from 1 to 20 carbon atoms, as used herein, refers to a moiety that can be selected independently from an aliphatic group having 1, 2, 3, 4, 5, 6, 7, 8, 9, 10, 11, 12, 13, 14, 15, 16, 17, 18, 19, or 20 carbon atoms, as well as any range between these two numbers (for example, an aliphatic group having 3 to 6 carbon atoms), and also including any combination of ranges between these two numbers (for example, an aliphatic group having 2 to 4 carbon atoms and an aliphatic group having 8 to 12 carbon atoms).

Similarly, another representative example follows for the weight ratio of organoaluminum to activator-support in a catalyst composition provided in one aspect of this invention. By a disclosure that the weight ratio of organoaluminum compound to activator-support is in a range from about 10:1 to about 1:1000, Applicants intend to recite that the weight ratio can be selected from about 10:1, about 9:1, about 8:1, about 7:1, about 6:1, about 5:1, about 4:1, about 3:1, about 2:1, about 1:1, about 1:5, about 1:10, about 1:25, about 1:50, about 1:75, about 1:100, about 1:150, about 1:200, about 1:250, about 1:300, about 1:350, about 1:400, about 1:450, about 1:500, about 1:550, about 1:600, about 1:650, about 1:700, about 1:750, about 1:800, about 1:850, about 1:900, about 1:950, or about 1:1000. Additionally, the weight ratio can be within any range from about 10:1 to about 1:1000 (for example, the weight ratio is in a range from about 3:1 to about 1:100), and this also includes any combination of ranges between about 10:1 to about 1:1000. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

While compositions and methods are described in terms of "comprising" various components or steps, the compositions and methods can also "consist essentially of" or "consist of" the various components or steps.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to half-metallocene compounds with a heteroatom-containing ligand bound to the transition metal, and catalyst compositions employing such hybrid metallocene compounds.

Hybrid Metallocene Compounds

The present invention discloses novel hybrid metallocene compounds having a metallocene moiety and a heteroatom-containing ligand, and methods of making these compounds. For convenience, these compounds will be referred to herein as hybrid metallocene compounds. In one aspect of this invention, the unbridged hybrid metallocene compounds have the formula:

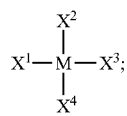
(I)

wherein:

M is Zr, Hf, or Ti;

$X^1$ and $X^2$ independently are a halide or a substituted or unsubstituted aliphatic, aromatic, or cyclic group, or a combination thereof;

$X^3$ is a substituted or unsubstituted cyclopentadienyl, indenyl, or fluorenyl group, any substituents on $X^3$ independently are a hydrogen atom or a substituted or unsubstituted aliphatic, aromatic, or cyclic group, or a combination thereof;

$X^4$ is —O—$R^A$, —NH—$R^A$, —PH—$R^A$, —S—$R^A$, or —$CR^B$=$NR^C$, wherein:

$R^A$ is an aryl group substituted with at least one alkenyl substituent, any substituents on $R^A$ other than the at least one alkenyl substituent independently are a hydrogen atom or a substituted or unsubstituted alkyl, alkenyl, or alkoxy group; and $R^B$ and $R^C$ independently are a hydrogen atom or a substituted or unsubstituted aliphatic, aromatic, or cyclic group, or a combination thereof.

Formula (I) above is not designed to show stereochemistry or isomeric positioning of the different moieties (e.g., this formula is not intended to display cis or trans isomers, or R or S diastereoisomers), although such compounds are contemplated and encompassed by this formula.

The metal in formula (I), M, is selected from Zr, Hf, or Ti. In one aspect of the present invention, M is either Zr or Ti.

In formula (I), $X^1$ and $X^2$ independently can be a halide, such as a fluorine, chlorine, bromine, or iodine atom. As used herein, an aliphatic group includes linear or branched alkyl and alkenyl groups. Generally, the aliphatic group contains from 1 to 20 carbon atoms. Unless otherwise specified, alkyl and alkenyl groups described herein are intended to include all structural isomers, linear or branched, of a given moiety; for example, all enantiomers and all diastereomers are included within this definition. As an example, unless otherwise specified, the term propyl is meant to include n-propyl and iso-propyl, while the term butyl is meant to include n-butyl, iso-butyl, t-butyl, sec-butyl, and so forth. For instance, non-limiting examples of octyl isomers include 2-ethyl hexyl and neooctyl. Examples of suitable alkyl groups which can be employed in the present invention include, but are not limited to, methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like.

Aromatic groups and combinations with aliphatic groups include aryl and arylalkyl groups, and these include, but are not limited to, phenyl, alkyl-substituted phenyl, naphthyl, alkyl-substituted naphthyl, phenyl-substituted alkyl, naphthyl-substituted alkyl, and the like. Generally, such groups and combinations of groups contain less than 20 carbon atoms. Hence, non-limiting examples of such moieties that can be used in the present invention include phenyl, tolyl, benzyl, dimethylphenyl, trimethylphenyl, phenylethyl, phenylpropyl, phenylbutyl, propyl-2-phenylethyl, and the like. Cyclic groups include cycloalkyl and cycloalkenyl moieties and such moieties can include, but are not limited to, cyclopentyl, cyclopentenyl, cyclohexyl, cyclohexenyl, and the like. One example of a combination including a cyclic group is a cyclohexylphenyl group. Unless otherwise specified, any substituted aromatic or cyclic moiety used herein is meant to include all regioisomers; for example, the term tolyl is meant to include any possible substituent position, that is, ortho, meta, or para.

In one aspect of the present invention, $X^1$ and $X^2$ independently are a substituted or unsubstituted aliphatic group having from 1 to 20 carbon atoms. In another aspect, $X^1$ and $X^2$ independently are methyl, ethyl, propyl, butyl, pentyl, hexyl, heptyl, octyl, nonyl, or decyl. In still another aspect, either $X^1$ or $X^2$, or both, are trimethylsilylmethyl. In yet another aspect, $X^1$ and $X^2$ independently are ethenyl, propenyl, butenyl, pentenyl, hexenyl, heptenyl, octenyl, nonenyl, or decenyl. $X^1$ and $X^2$ independently are a substituted or unsubstituted aromatic group, for example, having up to 20 carbon atoms, in another aspect of the present invention.

In a different aspect, $X^1$ and $X^2$ are both chlorine atoms. $X^1$ and $X^2$ independently can be selected from phenyl, naphthyl, tolyl, benzyl, dimethylphenyl, trimethylphenyl, phenylethyl, phenylpropyl, phenylbutyl, propyl-2-phenylethyl, cyclopentyl, cyclopentenyl, cyclohexyl, cyclohexenyl, or cyclohexylphenyl in other aspects of this invention. Yet, in another aspect, $X^1$ and $X^2$ independently are methyl, phenyl, benzyl, or a halide. Further, $X^1$ and $X^2$ independently can be methyl, phenyl, benzyl, or a chlorine atom in another aspect of the present invention.

In formula (I), $X^3$ is a substituted or unsubstituted cyclopentadienyl, indenyl, or fluorenyl group. In one aspect of the present invention, $X^3$ is a substituted or unsubstituted cyclopentadienyl group. In another aspect, $X^3$ is a substituted or unsubstituted indenyl group.

$X^3$ can be an unsubstituted cyclopentadienyl, indenyl, or fluorenyl group. Alternatively, $X^3$ can have one or more substituents. Any substituents on $X^3$ independently are a hydrogen atom or a substituted or unsubstituted aliphatic, aromatic, or cyclic group, or a combination thereof. Hydrogen is included, therefore the notion of a substituted indenyl and substituted fluorenyl includes partially saturated indenyls and fluorenyls including, but not limited to, tetrahydroindenyls, tetrahydrofluorenyls, and octahydrofluorenyls. Exemplary aliphatics which can be employed in the present invention include alkyls and alkenyls, examples of which include, but are not limited to, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, or decenyl, and the like. Illustrate aromatic groups and combinations with aliphatic groups, as discussed above, can include phenyl, tolyl, benzyl, and the like. Cyclic substituents are also contemplated herein, and non-limiting examples were also provided above, including moieties such as cyclopentyl and cyclohexyl.

In one aspect of this invention, each substituent on $X^3$ independently is a hydrogen atom, or a methyl, ethyl, propyl, n-butyl, t-butyl, or hexyl group. In another aspect, substituents on $X^3$ are selected independently from a hydrogen atom, ethenyl, propenyl, butenyl, pentenyl, hexenyl, heptenyl, octenyl, nonenyl, or decenyl.

$X^4$ in formula (I) is $-O-R^A$, $-NH-R^A$, $-PH-R^A$, $-S-R^A$, or $-CR^B=NR^C$. In the $-O-R^A$, $-NH-R^A$, $-PH-R^A$, and $-S-R^A$ moieties, $R^A$ is an aryl group substituted with at least one alkenyl substituent. Examples of suitable alkenyl group substituents include, but are not limited to, ethenyl, propenyl, butenyl, pentenyl, hexenyl, heptenyl, octenyl, nonenyl, decenyl, and the like. According to one aspect of the present invention, the at least one alkenyl substituent on $R^A$ is an ethenyl, a propenyl, or a butenyl.

In some aspects of this invention, $R^A$ contains no further substitutions. In other aspects, $R^A$ can be further substituted with a hydrogen atom or a substituted or unsubstituted alkyl, alkenyl, or alkoxy group. For example, suitable alkyls that can be substituents on $R^A$ include methyl, ethyl, propyl, butyl, pentyl, hexyl, heptyl, octyl, nonyl, or decyl, and the like. In addition to the at least one alkenyl substituent, $R^A$ can have additional alkenyl substituents selected from, for example, an ethenyl group, a propenyl group, a butenyl group, a pentenyl group, a hexenyl group, a heptenyl group, an octenyl group, a nonenyl group, and a decenyl group, and the like. Alkoxy substituents generally have between 1 and 20 carbons atoms and include, but are not limited to, methoxy, ethoxy, propoxy, or butoxy, and the like. In one aspect of the present invention, each substituent on $R^A$ other than the at least one alkenyl substituent independently is a hydrogen atom, a methyl group, an ethyl group, a propyl group, an n-butyl group, a t-butyl group, a methoxy group, an ethoxy group, a propoxy group, or a butoxy group.

In formula (I), $X^4$ can be $-O-R^A$. Non-limiting examples of $X^4$ in this aspect of the invention include the following moieties:

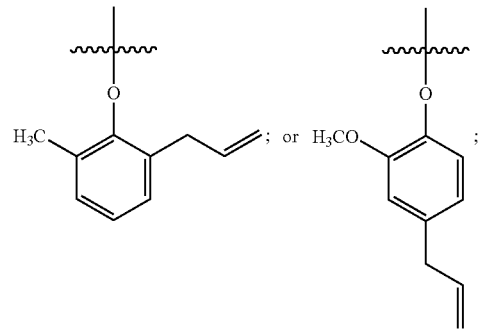

and the like.

$X^4$ in formula (I) can be $-CR^B=NR^C$, where $R^B$ and $R^C$ independently are a hydrogen atom or a substituted or unsubstituted aliphatic, aromatic, or cyclic group, or a combination thereof. Exemplary aliphatics which can be employed as $R^B$ and/or $R^C$ include the alkyl and alkenyl selections discussed above. These include, but are not limited to, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, or decenyl, and the like. Illustrate aromatic groups and combinations with aliphatic groups, also discussed above, can include phenyl, benzyl, tolyl, xylyl, and the like. Similarly, cyclic substituents can also be employed, and as discussed above, non-limiting examples include cyclopentyl, cyclohexyl, and the like.

In one aspect of this invention, $R^B$ and $R^C$ in the $-CR^B=NR^C$ moiety independently are a hydrogen atom, a methyl group, an ethyl group, a propyl group, an n-butyl group, a t-butyl group, a phenyl group, a benzyl group, a tolyl group, or a xylyl group. In formula (I), $X^4$ can be $-CR^B=NR^C$. A non-limiting example of $X^4$ in this aspect of the invention is the following moiety:

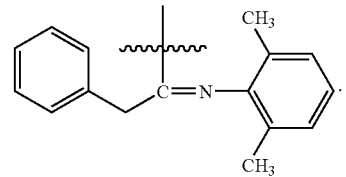

In formula (I), substituted aliphatic, aromatic, or cyclic groups, and combinations thereof, are disclosed, as well as substituted alkyl, alkenyl, or alkoxy groups. Such groups described herein are intended to include substituted analogs with substitutions at any position on these groups that conform to the normal rules of chemical valence. Thus, groups substituted with one or more than one substituent are contemplated.

Such substituents, when present, are independently selected from an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen; as long as these groups do not terminate the activity of the catalyst composition. Examples of each of these substituent groups include, but are not limited to, the following groups.

Examples of halide substituents, in each occurrence, include fluoride, chloride, bromide, and iodide.

In each occurrence, oxygen groups are oxygen-containing groups, examples of which include, but are not limited to, alkoxy or aryloxy groups ($-OR^X$), $-OSiR^X_3$, $-OPR^X_2$, $-OAlR^X_2$, and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms. Examples of alkoxy or aryloxy groups ($-OR^X$) groups include, but are not limited to, methoxy, ethoxy, propoxy, butoxy, phenoxy, substituted phenoxy, and the like.

In each occurrence, sulfur groups are sulfur-containing groups, examples of which include, but are not limited to, $-SR^X$ and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms.

In each occurrence, nitrogen groups are nitrogen-containing groups, which include, but are not limited to, $-NR^X_2$ and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms.

In each occurrence, phosphorus groups are phosphorus-containing groups, which include, but are not limited to, $-PR^X_2$, $-P(OR^X)_2$, and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms.

In each occurrence, arsenic groups are arsenic-containing groups, which include, but are not limited to, $-AsR^X_2$, $-As(OR^X)_2$, and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms.

In each occurrence, carbon groups are carbon-containing groups, which include, but are not limited to, alkyl halide groups that comprise halide-substituted alkyl groups with 1 to 20 carbon atoms, aralkyl groups with 1 to 20 carbon atoms, $-C(NR^X)H$, $-C(NR^X)R^X$, $-C(NR^X)OR^X$, and the like, including substituted derivatives thereof, wherein $R^X$ in each occurrence can be alkyl, cycloalkyl, aryl, aralkyl, substituted alkyl, substituted aryl, or substituted aralkyl having from 1 to 20 carbon atoms.

In each occurrence, silicon groups are silicon-containing groups, which include, but are not limited to, silyl groups such as alkylsilyl groups, arylsilyl groups, arylalkylsilyl groups, siloxy groups, and the like, which in each occurrence have from 1 to 20 carbon atoms. For example, silicon group substituents include trimethylsilyl and phenyloctylsilyl groups.

In each occurrence, germanium groups are germanium-containing groups, which include, but are not limited to, germyl groups such as alkylgermyl groups, arylgermyl groups, arylalkylgermyl groups, germyloxy groups, and the like, which in each occurrence have from 1 to 20 carbon atoms.

In each occurrence, tin groups are tin-containing groups, which include, but are not limited to, stannyl groups such as alkylstannyl groups, arylstannyl groups, arylalkylstannyl groups, stannoxy (or "stannyloxy") groups, and the like, which in each occurrence have from 1 to 20 carbon atoms. Thus, tin groups include, but are not limited to, stannoxy groups.

In each occurrence, lead groups are lead-containing groups, which include, but are not limited to, alkyllead groups, aryllead groups, arylalkyllead groups, and the like, which in each occurrence, have from 1 to 20 carbon atoms.

In each occurrence, boron groups are boron-containing groups, which include, but are not limited to, $-BR^X_2$, $-BX_2$, $-BR^XX$, and the like, wherein X is a monoanionic group such as hydride, alkoxide, alkyl thiolate, and the like, and wherein $R^X$ in each occurrence can be alkyl, cycloalkyl, aryl, aralkyl, substituted alkyl, substituted aryl, or substituted aralkyl having from 1 to 20 carbon atoms.

In each occurrence, aluminum groups are aluminum-containing groups, which include, but are not limited to, $-AlR^X$, $-AlX_2$, $-AlR^XX$, wherein X is a monoanionic group such as hydride, alkoxide, alkyl thiolate, and the like, and wherein $R^X$ in each occurrence can be alkyl, cycloalkyl, aryl, aralkyl, substituted alkyl, substituted aryl, or substituted aralkyl having from 1 to 20 carbon atoms.

Examples of inorganic groups that may be used as substituents, in each occurrence include, but are not limited to, $-OAlX_2$, $-OSiX_3$, $-OPX_2$, $-SX$, $-AsX_2$, $-PX_2$, and the like, wherein X is a monoanionic group such as hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to 20 carbon atoms.

Examples of organometallic groups that may be used as substituents, in each occurrence, include, but are not limited to, organoboron groups, organoaluminum groups, organogallium groups, organosilicon groups, organogermanium groups, organotin groups, organolead groups, organo-transition metal groups, and the like, having from 1 to 20 carbon atoms.

According to one aspect of the present invention, M is Zr or Ti in formula (I), and both $X^1$ and $X^2$ are methyl groups, phenyl groups, or benzyl groups. In this aspect, $X^3$ is an unsubstituted cyclopentadienyl or indenyl group, and $X^4$ is $-O-R^A$. In these and other aspects, $R^A$ is an aryl group substituted with one alkenyl substituent, such as propenyl or butenyl. Further, $R^A$ can be additionally substituted with, for example, a methyl or methoxy group.

In accordance with another aspect of the present invention, M is Zr or Ti in formula (I), and both $X^1$ and $X^2$ are methyl groups, phenyl groups, or benzyl groups. In this aspect, $X^3$ is an unsubstituted cyclopentadienyl or indenyl group, and $X^4$ is $-CR^B=NR^C$. In these and other aspects, $R^B$ and $R^C$ independently are a phenyl group, a benzyl group, a tolyl group, or a xylyl group.

Illustrative and non-limiting examples of hybrid metallocene compounds of the present invention include $(Ind)(X^4)Zr(CH_2Ph)_2$, wherein Ind is an abbreviation for indenyl, Ph is an abbreviation for phenyl, and $X^4$ is one of the following moieties:

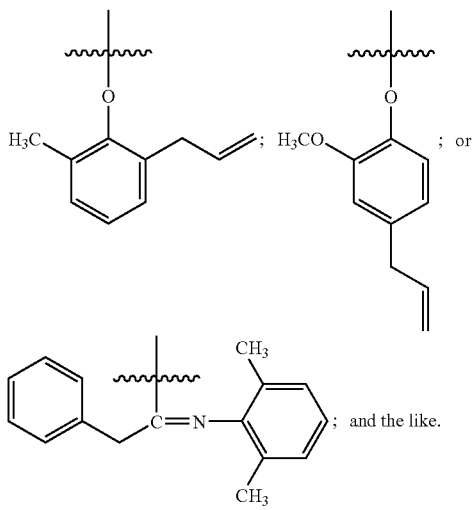

Other hybrid metallocene compounds are contemplated as being suitable for use in the present invention, but which do not fall within the scope of formula (I). These include, but are not limited to, the following compounds:

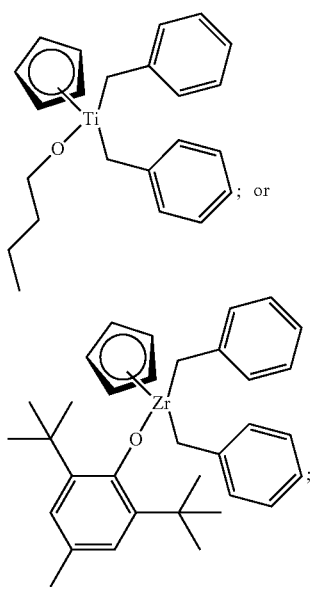

and the like. Additional hybrid metallocene compounds can be used in accordance with the present invention. Therefore, the scope of the present invention is not limited to the hybrid metallocene species provided above.

Methods of making the hybrid metallocene compounds of the present invention are also provided. One such method for synthesizing a hybrid metallocene compound of the present invention involves first the synthesis of, for example, half-metallocene compounds $CpZr(CH_2Ph)_3$ or $IndZr(CH_2Ph)_3$. These half-metallocene compounds can be synthesized in accordance with the procedures described in Scholz et al., "Benzyl compounds of electron-deficient transition metals. Molecular structure of $Cp_2Ti(CH_2Ph)_2$ and $CpZr(CH_2Ph)_3$," *Journal of Organometallic Chemistry* (1993), 443(1), 93-9, the disclosure of which is incorporated herein by reference in its entirety. This procedure employs initial reactant materials which are commercially available, for instance, benzylmagnesium chloride ($PhCH_2MgCl$), cyclopentadienylzirconium trichloride ($CpZrCl_3$), and indenylzirconium trichloride ($IndZrCl_3$).

Synthesis of a hybrid metallocene compound of the present invention from $CpZr(CH_2Ph)_3$ or $IndZr(CH_2Ph)_3$ can be accomplished using a representative procedure described in Thorn et al., "Synthesis, structure and molecular dynamics of $\eta^2$-iminoacyl compounds $[Cp(ArO)Zr(\eta^2-Bu^tNCCH_2Ph)(CH_2Ph)]$ and $[Cp(ArO)Zr(\eta^2-ButNCCH_2Ph)_2]$," *Journal of the Chemical Society, Dalton Transactions* (2002), 17, 3398-3405, the disclosure of which is incorporated herein by reference in its entirety.

Catalyst Compositions

The present invention also relates to catalyst compositions employing these half-metallocene compounds having a heteroatom-containing ligand. According to one aspect of the present invention, a catalyst composition is provided which comprises a contact product of at least one hybrid metallocene compound and at least one activator. This catalyst composition can further comprise at least one organoaluminum compound. The activator can be an activator-support, an aluminoxane compound, an organoboron or organoborate compound, an ionizing ionic compound, or a combination thereof.

These catalyst compositions can be used to produce polyolefins, both homopolymers and copolymers, for a variety of end-use applications. The at least one hybrid metallocene compound in these catalyst compositions has the formula:

(I)

wherein:

M is Zr, Hf, or Ti;

$X^1$ and $X^2$ independently are a halide or a substituted or unsubstituted aliphatic, aromatic, or cyclic group, or a combination thereof;

$X^3$ is a substituted or unsubstituted cyclopentadienyl, indenyl, or fluorenyl group, any substituents on $X^3$ independently are a hydrogen atom or a substituted or unsubstituted aliphatic, aromatic, or cyclic group, or a combination thereof;

$X^4$ is —O—$R^A$, —NH—$R^A$, —PH—$R^A$, —S—$R^A$, or —$CR^B$=$NR^C$, wherein:

$R^A$ is an aryl group substituted with at least one alkenyl substituent, any substituents on $R^A$ other than the at least one alkenyl substituent independently are a hydrogen atom or a substituted or unsubstituted alkyl, alkenyl, or alkoxy group; and $R^B$ and $R^C$ independently are a hydrogen atom or a substituted or unsubstituted aliphatic, aromatic, or cyclic group, or a combination thereof.

In accordance with this and other aspects of the present invention, it is contemplated that the catalyst compositions disclosed herein can contain additional bridged or unbridged metallocene compounds as well as more than one activator. Additionally, more than one organoaluminum compound is also contemplated.

In another aspect of the present invention, a catalyst composition is provided which comprises a contact product of at least one hybrid metallocene compound, at least one activator-support, and at least one organoaluminum compound, wherein this catalyst composition is substantially free of aluminoxanes, organoboron or organoborate compounds, and ionizing ionic compounds. In this aspect, the catalyst composition has catalyst activity, to be discussed below, in the absence of these additional materials.

However, in other aspects of this invention, these compounds can be employed as activators. For example, a catalyst composition comprising at least one hybrid metallocene compound and at least one activator is contemplated, and in this aspect, the activator is an aluminoxane compound, an organoboron or organoborate compound, an ionizing ionic compound, or any combination thereof. More than one activator or co-catalyst can be present in the catalyst composition.

In a different aspect, a catalyst composition is provided which comprises a contact product of at least one hybrid metallocene compound and at least one activator, wherein the at least one hybrid metallocene compound is:

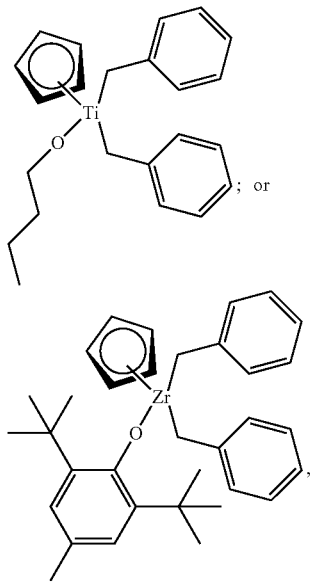

and the like, or a combination thereof. Optionally, this catalyst composition can further comprise at least one organoaluminum compound.

Activator-Support

The present invention encompasses various catalyst compositions containing an activator, which can be an activator-support. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof. Generally, the activator-support contains Brønsted acid groups.

The chemically-treated solid oxide exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, ionizing ionic compounds, and the like.

The chemically-treated solid oxide can comprise at least one solid oxide treated with at least one electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this invention are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present invention, the solid oxide used to prepare the chemically-treated solid oxide has a pore volume greater than about 0.1 cc/g. According to another aspect of the present invention, the solid oxide has a pore volume greater than about 0.5 cc/g. According to yet another aspect of the present invention, the solid oxide has a pore volume greater than about 1.0 cc/g.

In another aspect, the solid oxide has a surface area of from about 100 to about 1000 m$^2$/g. In yet another aspect, the solid oxide has a surface area of from about 200 to about 800 m$^2$/g. In still another aspect of the present invention, the solid oxide has a surface area of from about 250 to about 600 m$^2$/g.

The chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: Hawley's Condensed Chemical Dictionary, 11$^{th}$ Ed., John Wiley & Sons; 1995; Cotton, F. A.; Wilkinson, G.; Murillo; C. A.; and Bochmann; M. Advanced Inorganic Chemistry, 6$^{th}$ Ed., Wiley-Interscience, 1999.) For example, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used to form the chemically-treated solid oxide include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, like, including mixed oxides thereof, and combinations thereof. For example, the solid oxide can be silica, alumina, silica-alumina, aluminum phosphate, heteropolytungstates, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention include, but are not limited to, silica-alumina, silica-titania, silica-zirconia, zeolites, various clay minerals, alumina-titania, alumina-zirconia, zinc-aluminate, and the like.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions also can be employed in the present invention.

Thus, for example, the chemically-treated solid oxide used in the catalyst compositions of the present can be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, and the like, or combinations thereof.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which a chemically-treated solid oxide is prepared is as follows: a selected solid oxide compound, or combination of oxide compounds, is contacted with a first electron-withdrawing anion source compound to form a first mixture; this first mixture is calcined and then contacted with a second electron-withdrawing anion source compound to form a second mixture; the second mixture is then calcined to form a treated solid oxide compound. In such a process, the first and second electron-withdrawing anion source compounds can be either the same or different compounds.

According to another aspect of the present invention, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion include zinc, nickel, vanadium, titanium, silver, copper, gallium, tin, tungsten, molybdenum, and the like, or combinations thereof. Examples of chemically-treated solid oxides that contain a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present invention. The chemically-treated solid oxide can comprise the contact product of at least one solid oxide compound and at least one electron-withdrawing anion source. It is not required that the solid oxide compound be calcined prior to contacting the electron-withdrawing anion source. The contact product typically is calcined either during or after the solid oxide compound is contacted with the electron-withdrawing anion source. The solid oxide compound can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material is chemically-treated by contacting it with at least one electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present invention, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide compound with at least one electron-withdrawing anion source compound to form a first mixture; and 2) calcining the first mixture to form the solid oxide activator-support.

According to another aspect of the present invention, the solid oxide activator-support (chemically-treated solid oxide) is produced by a process comprising:

1) contacting at least one solid oxide compound with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 1 hour to about 50 hours, or for about 3 hours to about 20 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material is treated with a source of halide ion, sulfate ion, or a combination of anions, optionally treated with a metal ion, and then calcined to provide the chemically-treated solid oxide in the form of a particulate solid. For example, the solid oxide material is treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia; a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, an the like, and combinations thereof. Gaseous hydrogen fluoride or fluorine itself also can be used with the solid oxide if fluorided while calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used. For example, volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide while calcination.

The amount of fluoride or chloride ion present before calcining the solid oxide generally is from about 2 to about 50% by weight, where the weight percent is based on the weight of the solid oxide, for example, silica-alumina, before calcining. According to another aspect of this invention, the amount of fluoride or chloride ion present before calcining the solid oxide is from about 3 to about 25% by weight, and according to another aspect of this invention, from about 4 to about 20% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present invention, the pore volume is greater than about 0.8 cc/g, and according to another aspect of the present invention, greater than about 1.0 cc/g. Further, the silica-alumina generally has a surface area greater than about 100 $m^2/g$. According to another aspect of this invention, the surface area is greater than about 250 $m^2/g$. Yet, in another aspect, the surface area is greater than about 350 $m^2/g$.

The silica-alumina utilized in the present invention typically has an alumina content from about 5 to about 95% by weight. According to one aspect of this invention, the alumina content of the silica-alumina is from about 5 to about 50%, or from about 8% to about 30%, alumina by weight. In another aspect, high alumina content silica-alumina compounds can be employed, in which the alumina content of these silica-alumina compounds typically ranges from about 60% to about 90%, or from about 65% to about 80%, alumina by weight. According to yet another aspect of this invention, the solid oxide component comprises alumina without silica, and according to another aspect of this invention, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present invention, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 parts by weight to about 100 parts by weight sulfate ion to about 100 parts by weight solid oxide. According to another aspect of this invention, the amount of sulfate ion present before calcining is from about 1 part by weight to about 50 parts by weight sulfate ion to about 100 parts by weight solid oxide, and according to still another aspect of this invention, from about 5 parts by weight to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention comprises an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the unbridged metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III) and Zn(II) with ligands such as halide, acetate, sulfate, nitrate, or nitrite.

According to another aspect of the present invention, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof.

In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the hybrid metallocene compounds can be precontacted with an olefin monomer and an organoaluminum compound for a first period of time prior to contacting this mixture with the activator-support. Once the precontacted mixture of the metallocene compound(s), olefin monomer, and organoaluminum compound is contacted with the activator-support, the composition further comprising the activator-support is termed a "postcontacted" mixture. The postcontacted mixture can be allowed to remain in further contact for a second period of time prior to being charged into the reactor in which the polymerization process will be carried out.

According to yet another aspect of the present invention, one or more of the hybrid metallocene compounds can be precontacted with an olefin monomer and an activator-support for a first period of time prior to contacting this mixture with the organoaluminum compound. Once the precontacted mixture of the metallocene compound(s), olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor. A non-limiting example of precontacting in accordance with this aspect of the invention is illustrated in Example 6 that follows.

Organoaluminum Compounds

In one aspect, organoaluminum compounds that can be used with the present invention include, but are not limited to, compounds having the formula:

$(R^2)_3Al$;

where $R^2$ is an aliphatic group having from 2 to 6 carbon atoms. For example, $R^2$ can be ethyl, propyl, butyl, hexyl, or isobutyl.

Other organoaluminum compounds which can be used in accordance with the present invention include, but are not limited to, compounds having the formula:

$Al(X^5)_m(X^6)_{3-m}$, where $X^5$ is a hydrocarbyl; $X^6$ is an alkoxide or an aryloxide, a halide, or a hydride; and m is from 1 to 3, inclusive.

In one aspect, $X^5$ is a hydrocarbyl having from 1 to about 20 carbon atoms. In another aspect of the present invention, $X^5$ is an alkyl having from 1 to 10 carbon atoms. For example, $X^5$ can be ethyl, propyl, n-butyl, sec-butyl, isobutyl, or hexyl, and the like, in yet another aspect of the present invention.

According to one aspect of the present invention, $X^6$ is an alkoxide or an aryloxide, any one of which has from 1 to 20 carbon atoms, a halide, or a hydride. In another aspect of the present invention, $X^6$ is selected independently from fluorine or chlorine. Yet, in another aspect, $X^6$ is chlorine.

In the formula, $Al(X^5)_m(X^6)_{3-m}$, m is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tripropylaluminum, diethylaluminum ethoxide, tributylaluminum, diisobutylaluminum hydride, triisobutylaluminum, diethylaluminum chloride, and the like, or combinations thereof.

The present invention contemplates a method of precontacting at least one unbridged hybrid metallocene compound with at least one organoaluminum compound and an olefin monomer to form a precontacted mixture, prior to contacting this precontacted mixture with the activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention provides a catalyst composition which contains an activator, and in some aspects of the invention, the activator comprises an aluminoxane compound. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

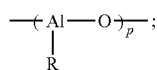

wherein R is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

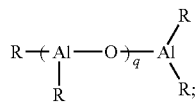

wherein R is a linear or branched alkyl having from 1 to 10 carbon atoms, and q is an integer from 1 to 50, are also encompassed by this invention.

Further, aluminoxanes can have cage structures of the formula $R^t_{5r+\alpha}R^b_{r-\alpha}Al_4rO_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and $\alpha$ is equal to $n_{Al(3)}-n_{O(2)}+n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_qAlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_qAlR_2$, respectively. Is some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of hybrid metallocene compound (or compounds) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^2)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^2)_3Al$ with a hydrated salt, such as hydrated copper sulfate, in an inert organic solvent.

Organoboron/Organoborate Compounds

According to another aspect of the present invention, the catalyst composition can comprise an organoboron or organoborate activator. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl) phenyl]borate, triphenylcarbenium tetrakis[3,5-bis(trifluoromethyl)phenyl]borate, and the like, or mixtures thereof. Examples of fluoroorgano boron compounds that can be used as optional co-catalysts in the present invention include, but are not limited to, tris(pentafluorophenyl)boron, tris[3,5-bis (trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of hybrid metallocene compound (or compounds) in the catalyst composition is in a range from about 0.1:1 to about 15:1. Typically, the amount of the fluoroorgano boron or fluoroorgano borate compound used as a co-catalyst for the hybrid metallocene is from about 0.5 moles to about 10 moles of boron/borate compound per mole of unbridged hybrid metallocene compound. According to another aspect of this invention, the amount of fluoroorgano boron or fluoroorgano borate compound is from about 0.8 moles to about 5 moles of boron/borate compound per mole of hybrid metallocene compound.

Ionizing Ionic Compounds

The present invention further provides a catalyst composition which can comprise an ionizing ionic compound. An ionizing ionic compound is an ionic compound that can function as an activator or co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand such as $X^1$ or $X^2$, from the hybrid metallocene. However, the ionizing ionic compound is an activator regardless of whether it is ionizes the hybrid metallocene, abstracts an $X^1$ or $X^2$ ligand in a fashion as to form an ion pair, weakens the metal-$X^1$ or metal-$X^2$ bond in the hybrid metallocene, simply coordinates to an $X^1$ or $X^2$ ligand, or activates the hybrid metallocene compound by some other mechanism.

Further, it is not necessary that the ionizing ionic compound activate the hybrid metallocene compound only. The activation function of the ionizing ionic compound can be evident in the enhanced activity of catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis [3,5-bis(trifluoro-methyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoro-methyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis-(pentafluorophenyl)borate, potassium tetraphenylborate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluoro-phenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from about 2 to 30 carbon atoms per molecule and having at least one olefinic double bond. This invention encompasses homopolymerization processes using a single olefin such as ethylene or propylene, as well as copolymerization reactions with at least one different olefinic compound. The resulting copolymers generally contain a major amount of ethylene (>50 mole percent) and a minor amount of comonomer (<50 mole percent), though this is not a requirement. The comonomers that can be copolymerized with ethylene often have from 3 to 20 carbon atoms in their molecular chain.

Acyclic, cyclic, polycyclic, terminal ($\alpha$), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, can also be polymerized as described above. Styrene can also be employed as a monomer in the present invention.

When a copolymer is desired, the monomer can be, for example, ethylene or propylene, which is copolymerized with a comonomer. Examples of olefin comonomers include, but are not limited to, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, and the like. According to one aspect of the present invention, the comonomer is selected from 1-butene, 1-pentene, 1-hexene, 1-octene, 1-decene, and styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Preparation of the Catalyst Composition

In one aspect, the present invention encompasses a catalyst composition comprising a contact product of an unbridged hybrid metallocene compound and an activator. Such a composition can further comprise an organoaluminum compound. Suitable activators include, but are not limited to, activator-supports, aluminoxane compounds, organoboron or organoborate compounds, ionizing ionic compounds, and the like, or combinations thereof.

This invention further encompasses methods of making these catalyst compositions, such as, for example, contacting the respective catalyst components in any order or sequence.

In one aspect of the invention, the at least one hybrid metallocene compound can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the hybrid metallocene compound or compounds, the olefinic monomer, and the organoaluminum compound typically ranges from a time period of about 0.1 hour to about 24 hours, for example, from about 0.1 to about 1 hour. Precontact times from about 10 minutes to about 30 minutes are also employed.

In another aspect of the invention, the at least one hybrid metallocene compound can be precontacted with an olefinic monomer and an activator-support for a first period of time prior to contacting this precontacted mixture with an organoaluminum compound. The first period of time for contact, the precontact time, between the hybrid metallocene compound or compounds, the olefinic monomer, and the activator-support typically ranges from a time period of about 0.1 hour to about 24 hours, for example, from about 0.1 to about 2 hours. Precontact times from about 10 minutes to about 60 minutes are also employed.

Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, unbridged hybrid metallocene, activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the hybrid metallocene compound, olefin monomer, and organoaluminum co-catalyst is contacted with the activator-support, this composition (with the addition of the activator-support) is termed the "postcontacted mixture." The postcontacted mixture optionally remains in contact for a second period of time, the postcontact time, prior to initiating the polymerization process. Postcontact times between the precontacted mixture and the activator-support generally range from about 0.1 hour to about 24 hours. In a further aspect, the postcontact time is in a range from about 0.1 hour to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

According to one aspect of this invention, the molar ratio of the moles of hybrid metallocene compound to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of unbridged hybrid metallocene compound to the moles of organoaluminum compound is in a range from about 1:1 to about 1:100. These molar ratios reflect the ratio of total moles of metallocene compound or compounds to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of hybrid metallocene compound in the precontacted mixture is typically in a range from about 1:10 to about 100,000:1. Total moles of each component are used in this ratio to account for aspects of this invention where more than one olefin monomer and/or more than metallocene compound is employed. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support is employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of hybrid metallocene to activator-support is in a range from about 1:1 to about 1:1,000,000. If more than one unbridged hybrid metallocene and/or more than one activator-support is employed, this ratio is based on the total weight of each respective component. In another aspect, this weight ratio is in a range from about 1:5 to about 1:100,000, or from about 1:10 to about 1:10,000. Yet, in another aspect, the weight ratio of the unbridged hybrid metallocene compound to the activator-support is in a range from about 1:20 to about 1:1000.

According to some aspects of this invention, aluminoxane compounds are not required to form the catalyst composition. Thus, the polymerization can proceed in the absence of aluminoxanes. Accordingly, the present invention can use, for example, organoaluminum compounds and an activator-support in the absence of aluminoxanes. While not intending to be bound by theory, it is believed that the organoaluminum compound likely does not activate the metallocene catalyst in the same manner as an organoaluminoxane compound.

Additionally, in some aspects, organoboron and organoborate compounds are not required to form a catalyst composition of this invention. Nonetheless, aluminoxanes, organoboron or organoborate compounds, ionizing ionic compounds, or combinations thereof, can be used in other catalyst compositions contemplated by and encompassed within the present invention. Hence, aluminoxanes, organoboron or organoborate compounds, ionizing ionic compounds, or combinations thereof, can be employed with the hybrid metallocene compound, for example, either in the presence or in the absence of an organoaluminum compound.

Catalyst compositions of the present invention generally have a catalyst activity greater than about 100 grams of polyethylene per gram of activator-support per hour (abbreviated gP/(gAS·hr)). In another aspect, the catalyst activity is greater than about 150, greater than about 200, or greater than about 250 gP/(gAS·hr). In still another aspect, catalyst compositions of this invention are characterized by having a catalyst activity greater than about 500, greater than about 1000, or greater than about 1500 gP/(gAS·hr). Yet, in another aspect, the catalyst activity is greater than about 2000 gP/(gAS·hr). This activity is measured under slurry polymerization conditions using isobutane as the diluent, at a polymerization temperature of about 90° C. and an ethylene pressure of about 450 psig.

As discussed above, any combination of the hybrid metallocene compound, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, the hybrid metallocene compound, the organoaluminum compound, and 1-hexene can be used in a precontacting step for a first period of time, and this precontacted mixture then can be contacted with the activator-support to form a postcontacted mixture that is contacted for a second period of time prior to initiating the polymerization reaction. For example, the first period of time for contact, the precontact time, between any combination of the hybrid metallocene compound, the olefinic monomer, the activator-support, and the organoaluminum compound can be from about 0.1 hour to about 24 hours, from about 0.1 to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 0.1 hour to about 24 hours, or from about 0.1 hour to about 1 hour.

Polymerization Process

Catalyst compositions of the present invention can be used to polymerize olefins to form homopolymers or copolymers. One such process for polymerizing olefins in the presence of a catalyst composition of the present invention comprises contacting the catalyst composition with at least one olefin monomer and optionally at least one olefin comonomer under polymerization conditions to produce a polymer or copolymer, wherein the catalyst composition comprises a contact product of at least one hybrid metallocene compound and at least one activator. In this aspect, the at least one hybrid metallocene compound has the following formula:

(I)

wherein:

M is Zr, Hf, or Ti;

$X^1$ and $X^2$ independently are a halide or a substituted or unsubstituted aliphatic, aromatic, or cyclic group, or a combination thereof;

$X^3$ is a substituted or unsubstituted cyclopentadienyl, indenyl, or fluorenyl group, any substituents on $X^3$ independently are a hydrogen atom or a substituted or unsubstituted aliphatic, aromatic, or cyclic group, or a combination thereof;

$X^4$ is —O—$R^A$, —NH—$R^A$, —PH—$R^A$, —S—$R^A$, or —$CR^B$=$NR^C$, wherein:

$R^A$ is an aryl group substituted with at least one alkenyl substituent, any substituents on $R^A$ other than the at least one alkenyl substituent independently are a hydrogen atom or a substituted or unsubstituted alkyl, alkenyl, or alkoxy group; and $R^B$ and $R^C$ independently are a hydrogen atom or a substituted or unsubstituted aliphatic, aromatic, or cyclic group, or a combination thereof.

In a different aspect, the polymerization process can employ a catalyst composition which comprises a contact product of at least one hybrid metallocene compound and at least one activator, wherein the at least one hybrid metallocene compound is:

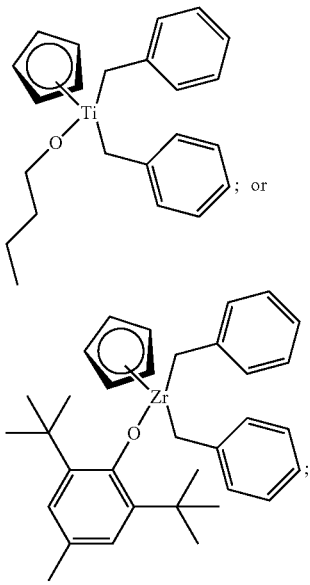

or a combination thereof.

The catalyst compositions of the present invention are intended for any olefin polymerization method using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series or in parallel.

According to one aspect of the invention, the polymerization reactor system may comprise at least one loop slurry reactor comprising vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight, and molecular weight distribution. Suitable polymerization temperature may be any temperature below the de-polymerization temperature according to the Gibbs Free energy equation. Typically, this includes from about 60° C. to about 280° C., for example, or from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including, but not limited to, bottles, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Homopolymers and copolymers of ethylene produced in accordance with this invention generally have a melt index from about 0.01 to about 100 g/10 min. For example, a melt index in the range from about 0.1 to about 50 g/10 min, or from about 0.5 to about 25 g/10 min, are contemplated in some aspects of this invention.

The density of ethylene-based polymers produced using one or more hybrid metallocene compounds of the present invention typically falls within the range from about 0.88 to about 0.97 g/cc. In one aspect of this invention, the polymer density is in a range from about 0.90 to about 0.95 g/cc. Yet, in another aspect, the density is generally in a range from about 0.91 to about 0.94 g/cc.

If the resultant polymer produced in accordance with the present invention is, for example, a polymer or copolymer of ethylene, it can be formed into various articles of manufacture. Such articles include, but are not limited to, molded products, household containers, utensils, film or sheet products, drums, fuel tanks, pipes, geomembranes, liners, and the like. Various processes can be employed to form these articles. Non-limiting examples of these processes include injection molding, blow molding, film extrusion, sheet extrusion, profile extrusion, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—α. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time;
α="breadth" parameter;
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, Fluid Mechanics, 2nd Edition, John Wiley & Sons (1987); each of which is incorporated herein by reference in its entirety.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300 mm) and were calibrated with a broad linear polyethylene standard (Phillips Marlex® BHB 5003) for which the molecular weight had been determined. The following abbreviations are used in the Examples that follow: Mn is the number-average molecular weight; Mw is the weight-average molecular weight; and PDI is the polydispersity index, determined by the ratio Mw/Mn, a measure of molecular weight distribution.

Ethylene was polymerization grade ethylene obtained from Union Carbide Corporation. This ethylene was then further purified through a column of ¼-inch beads of Alcoa A201 alumina, activated at about 250° C. in nitrogen. Isobutane was polymerization grade obtained from Phillips Petroleum Company, which was further purified by distillation and then also passed through a column of ¼-inch beads of Alcoa A201 alumina, activated at about 250° C. in nitrogen. The 1-hexene was polymerization grade obtained from Chevron Chemical Company, which was further purified by nitrogen purging and storage over 13× molecular sieve activated at about 250° C. Triethylaluminum (TEA) was obtained from Akzo Corporation as a one molar solution in heptane.

All polymerizations were conducted in a one-gallon stirred reactor. First, the reactor was purged with nitrogen and heated to about 120° C. After cooling to below about 40° C. and purging with isobutane vapor, about 3.5 mg of the hybrid metallocene compound were charged to the reactor under nitrogen. Approximately 100 mg of the activator-support (A-S) were then added to the reactor, followed by about 0.5 mL of 1M triethylaluminum (TEA) co-catalyst. The reactor was then closed, 1-hexene comonomer and two liters of isobutane were added, and the reactor was subsequently heated to about 90° C. The reactor contents were mixed at 700 rpm. Ethylene was then added to the reactor and fed on demand to maintain a constant total pressure of about 450 psig. The reactor was maintained and controlled at 90° C. throughout the 60-minute run time of the polymerization. Upon completion, the isobutane and ethylene were vented from the reactor, the reactor was opened, and the polymer product was collected and dried.

Example 1

Synthesis of a Fluorided Silica-Alumina Activator-Support

A silica-alumina was obtained from W.R. Grace Company containing about 13% alumina by weight and having a surface area of about 400 m$^2$/g and a pore volume of about 1.2 mL/g. This material was obtained as a powder having an average particle size of about 70 microns. Approximately 100 grams of this material were impregnated with a solution containing about 200 mL of water and about 10 grams of ammonium hydrogen fluoride, resulting in a damp powder having the consistency of wet sand. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 450° C. At this temperature, the powder was allowed to fluidize for about three hours in the dry air. Afterward, the fluorided silica-alumina was collected and stored under dry nitrogen, and was used without exposure to the atmosphere. The fluorided silica-alumina activator-support of Example 1 is abbreviated A-S1.

Example 2

Synthesis of a Sulfated Alumina Activator-Support

Bohemite was obtained from W.R. Grace Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina was collected and stored under dry nitrogen, and was used without exposure to the atmosphere. The sulfated alumina activator-support of Example 2 is abbreviated A-S2.

Example 3-4

Comparison of Polymer Made Using Hybrid Metallocene MET 1 and A-S1 to a Commercial LLDPE Copolymer Produced Using a Chromium-Based Catalyst System The hybrid metallocene compound used in Example 3, abbreviated "MET 1," has the following structure:

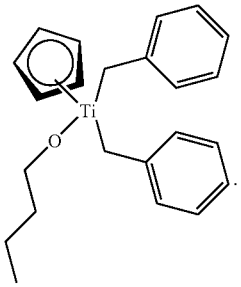

The MET 1 hybrid metallocene compound of Example 3 can be prepared in accordance with any suitable method. One such synthesis technique reacts cyclopentadienyl titanium trichloride with three equivalents of benzyl magnesium chloride followed by reaction with one equivalent of n-butanol. These reactions are generally conducted at low temperature.

In Example 3, the reactor was charged with 3.5 mg of MET 1 (hybrid metallocene), 100 mg of A-S1 (fluorided silica-alumina), 48 mL of 1-hexene, and 2 liters of isobutane. Triethylaluminum (TEA) was not employed in Example 3. After one hour of polymerization at 90° C. and 450 psig ethylene pressure, the reaction was stopped and 309 g of polymer were removed from the reactor.

Table I summarizes the polymer resin properties of Example 3. Properties of Example 4 are provided for comparison. Comparative Example 4 was a sample of a LLDPE copolymer resin commercially available from Chevron-Phillips Chemical Company, which was produced using a chromium-based catalyst system. As shown in Table I, the polymer properties of Example 3 and Example 4 are very similar.

TABLE I

Polymer property comparison for Examples 3-4.

| Example | Catalyst Type | MI | HLMI | Density | PDI |
|---|---|---|---|---|---|
| 3 | Hybrid | 0.17 | 25.4 | 0.928 | 10.3 |
| 4 | Chromium | 0.18 | 28 | 0.925 | 12 |

FIG. 1 compares the molecular weight distribution of the polymer of Example 3, produced using hybrid metallocene MET 1, with that of Example 4, a commercially available polymer produced using a chromium catalyst. The molecular weight distribution profiles of Example 3 and Example 4 are very similar. Example 3, however, has less of the low molecular weight fraction which can contribute to smoking during processing and to transport line wax build-up than the chromium-catalyzed polymer of Example 4.

The hybrid metallocene catalysts of the present invention allow the production of a polymer with properties similar to that of Example 4 without using a chromium-based catalyst system.

Examples 5-7

Comparison of Polymers Made Using Hybrid Metallocene MET 2 and A-S2, with and without Precontacting, to Commercial LLDPE Copolymers The hybrid metallocene compound used in Examples 5-6, abbreviated "MET 2," has the following structure:

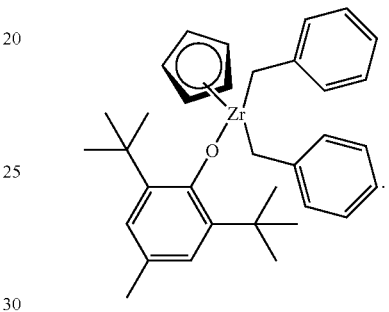

The MET 2 hybrid metallocene compound of Examples 5-6 can be prepared in accordance with any suitable method. One such synthesis technique reacts cyclopentadienylzirconium trichloride with three equivalents of benzylmagnesium chloride, following by a reaction with one equivalent of 2,6-di-tert-butyl-4-methylphenol. The reaction employing the Grignard reagent is generally conducted at a low temperature. The tri-benzyl intermediate can be isolated at room temperature and stored at about 0° C. for long periods of time without significant decomposition. Alternatively, the tri-benzyl intermediate can be used in situ to prepare hybrid metallocene compounds (e.g., MET 2 and similar compounds) in a 1-pot reaction.

In Example 5, the reactor was charged with 3.5 mg of MET 2 (hybrid metallocene), 100 mg of A-S2 (sulfated alumina), 0.5 mL of 1M TEA (triethylaluminum), 40 mL of 1-hexene, and 2 liters of isobutane. After one hour of polymerization at 90° C. and 450 psig ethylene pressure, the reaction was stopped and 213 g of polymer were removed from the reactor. The polymer of Example 5 had a melt index of 0.35, a high load melt index of 32.2, a density of 0.9283, and a polydispersity of about 15.

Example 6 was conducted in the same manner as Example 5, except that the hybrid metallocene (MET 2), the sulfated alumina activator-support (A-S2), and 1-hexene were precontacted prior to be introduced into the reactor. For Example 6, MET 2, A-S2, and 1-hexene were slurried in a vial containing 20 mL of n-heptane for 1 hour prior to being introduced to the reactor and subsequent contacting with ethylene and TEA co-catalyst. 185 g of polymer were obtained from the polymerization of Example 6.

Figure 2:
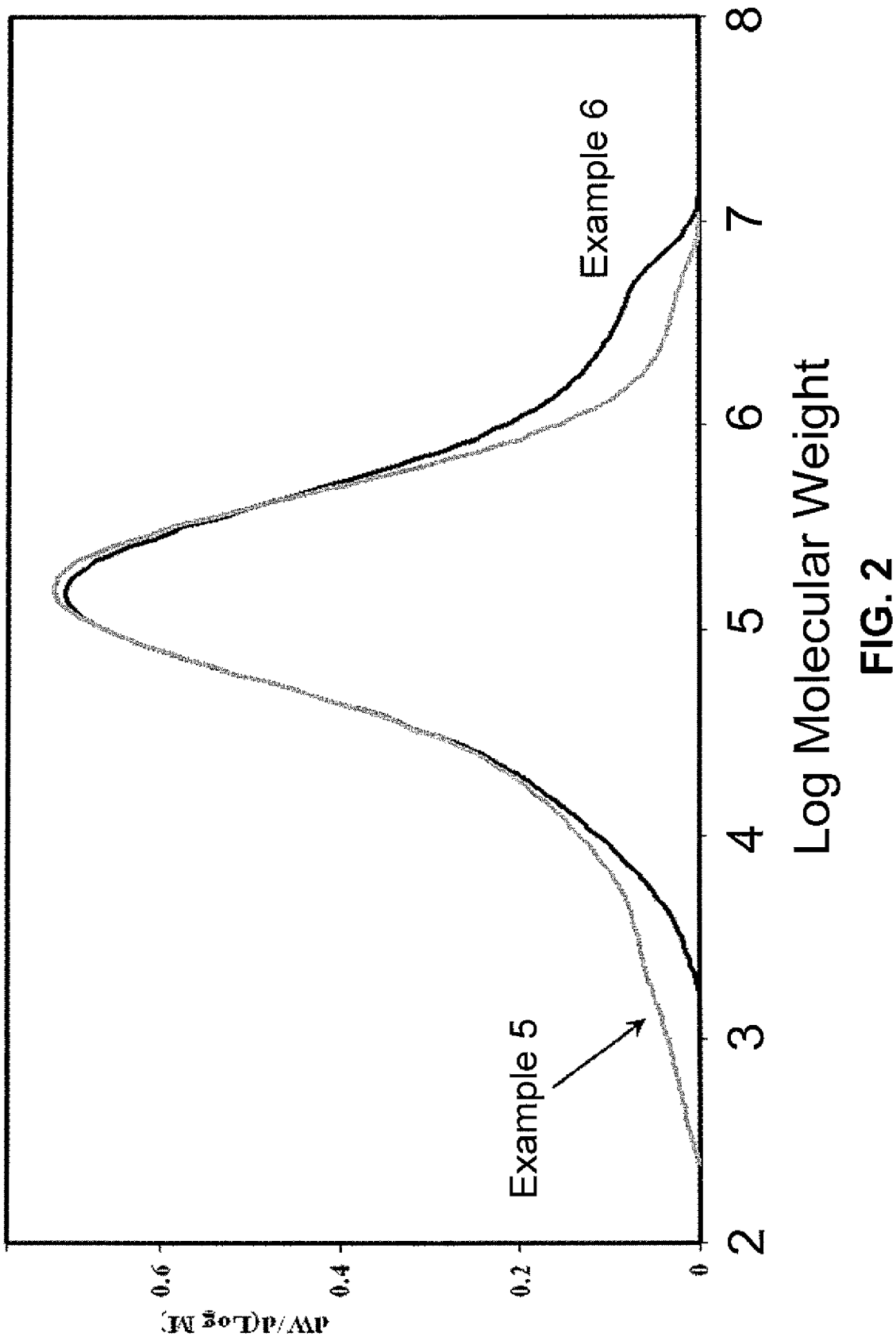
FIG. 2 presents a plot of the molecular weight distributions of the polymers of Example 5 and Example 6.

FIG. 2 compares the molecular weight distributions of the polymers of Examples 5-6, and illustrates the impact of precontacting (the hybrid metallocene, the activator-support, and an olefin) on molecular weight distribution. Precontacting, as in Example 6, resulted in a polymer with less of the low molecular weight fraction and more of the high molecular weight fraction. Hence, the molecular weight distribution can be changed by varying the order in which the components of the catalyst system are combined together, and precontacting with an olefin.

Figure 3:
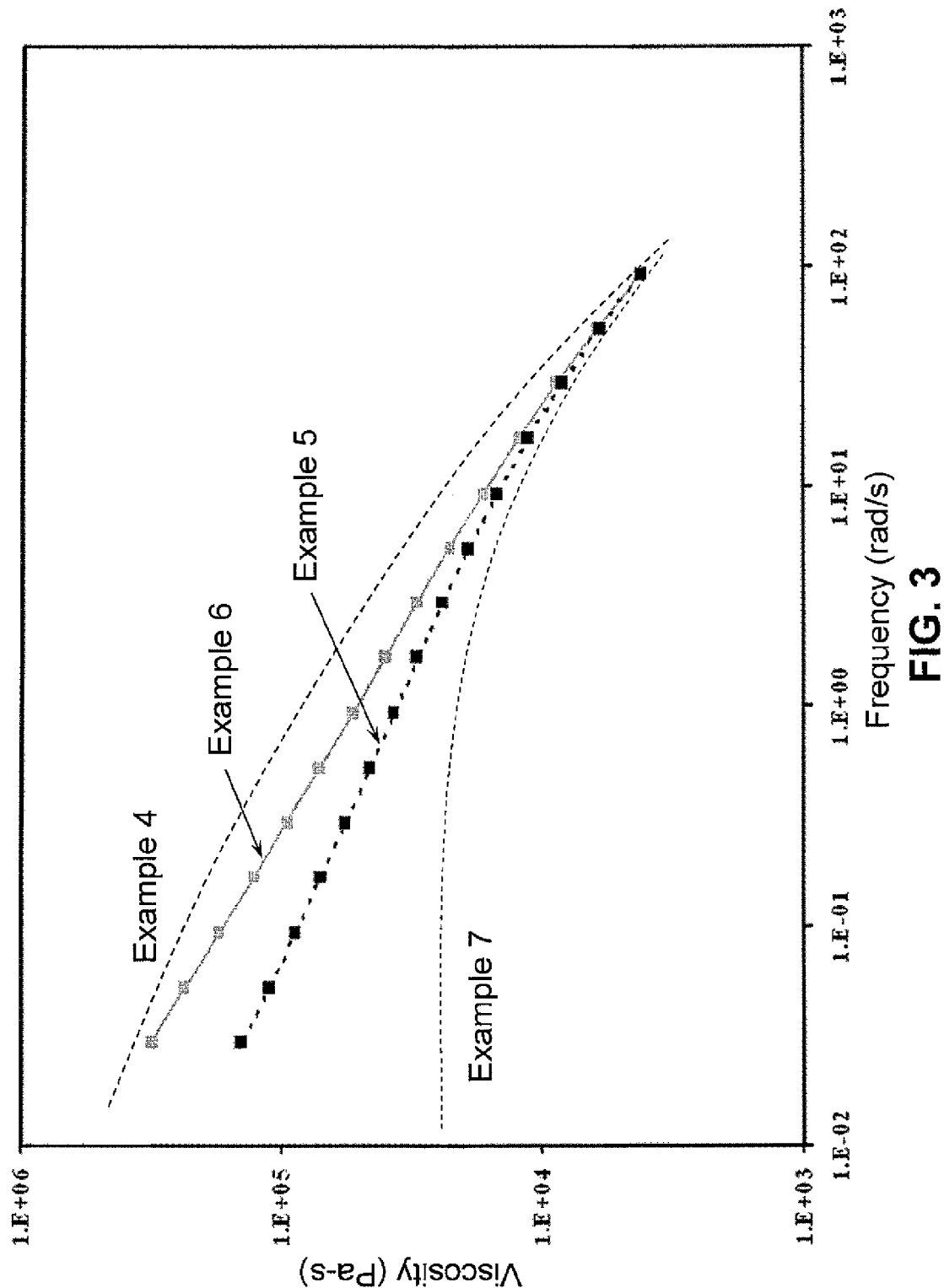
FIG. 3 presents a dynamic melt viscosity versus frequency plot, measured at 190° C., for the polymers of Examples 4-7.

FIG. 3 compares the rheological properties of the polymers of Examples 4-7. Comparative Example 4 was a sample of a LLDPE copolymer resin produced using a chromium catalyst system. Examples 5-6 were produced using a hybrid metallocene of the present invention. Comparative Example 7 was a sample of a LLDPE copolymer produced using a metallocene catalyst system, commercially available from Chevron-Phillips Chemical Company. This LLDPE resin has a melt index of 1.4, a density of 0.916, and a PDI of about 2.3. As illustrated in FIG. 3, the polymers of Examples 5-6 exhibited shear behavior similar to that of the chromium-derived resin of Comparative Example 4. That is, Examples 5-6 have high melt viscosity at low shear rates, and low melt viscosity at high shear rates. FIG. 3 also demonstrates the difference in the rheological properties of the polymers of Example 5 and Example 6, due to the precontacting step discussed above.

Examples 8-12

Comparison of Polymers Made Using Hybrid Metallocenes Having Formula (I) and A-S2, and the Effect of Precontacting The hybrid metallocenes used in Examples 8-12 had the formula (I):

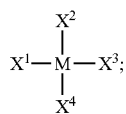
(I)

wherein M was Zr, $X^1$ and $X^2$ were both benzyl, $X^3$ was an unsubstituted indenyl, and $X^4$ was:

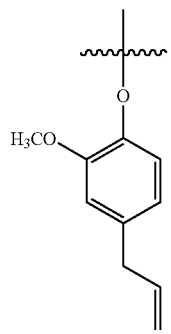

for Examples 8 and 11;

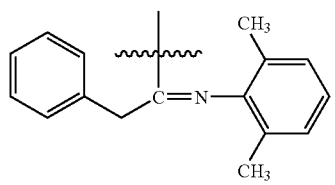

for Example 9; and

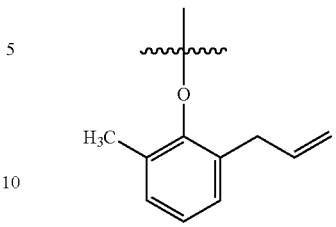

for Examples 10 and 12.

These hybrid metallocenes can be prepared in accordance with any suitable method. One such synthesis technique reacts indenylzirconium trichloride with three equivalents of benzylmagnesium chloride, following by a reaction with one equivalent of an aryl alcohol or imine, respectively, depending on the example compound being prepared. The reaction employing the Grignard reagent is generally conducted at a low temperature. The tri-benzyl intermediate can be isolated at room temperature and stored at about 0° C. for long periods of time without significant decomposition. Alternatively, the tri-benzyl intermediate can be used in situ to prepare hybrid metallocene compounds (e.g., compounds used in Examples 8-12 and similar compounds) in a 1-pot reaction.

For each of Examples 8-12, the reactor was charged with 3.5 mg of the respective hybrid metallocene, 100 mg of A-S2 (sulfated alumina), 0.5 mL of 1M TEA, 40 mL of 1-hexene, and 2 liters of isobutane. The polymerization runs were conducted for one hour at 90° C. and 450 psig ethylene pressure. For Examples 8-10, the respective hybrid metallocene, A-S2, and 1-hexene were precontacted in the manner described in Example 6. Examples 11-12 did not utilize precontacting.

Figure 4:
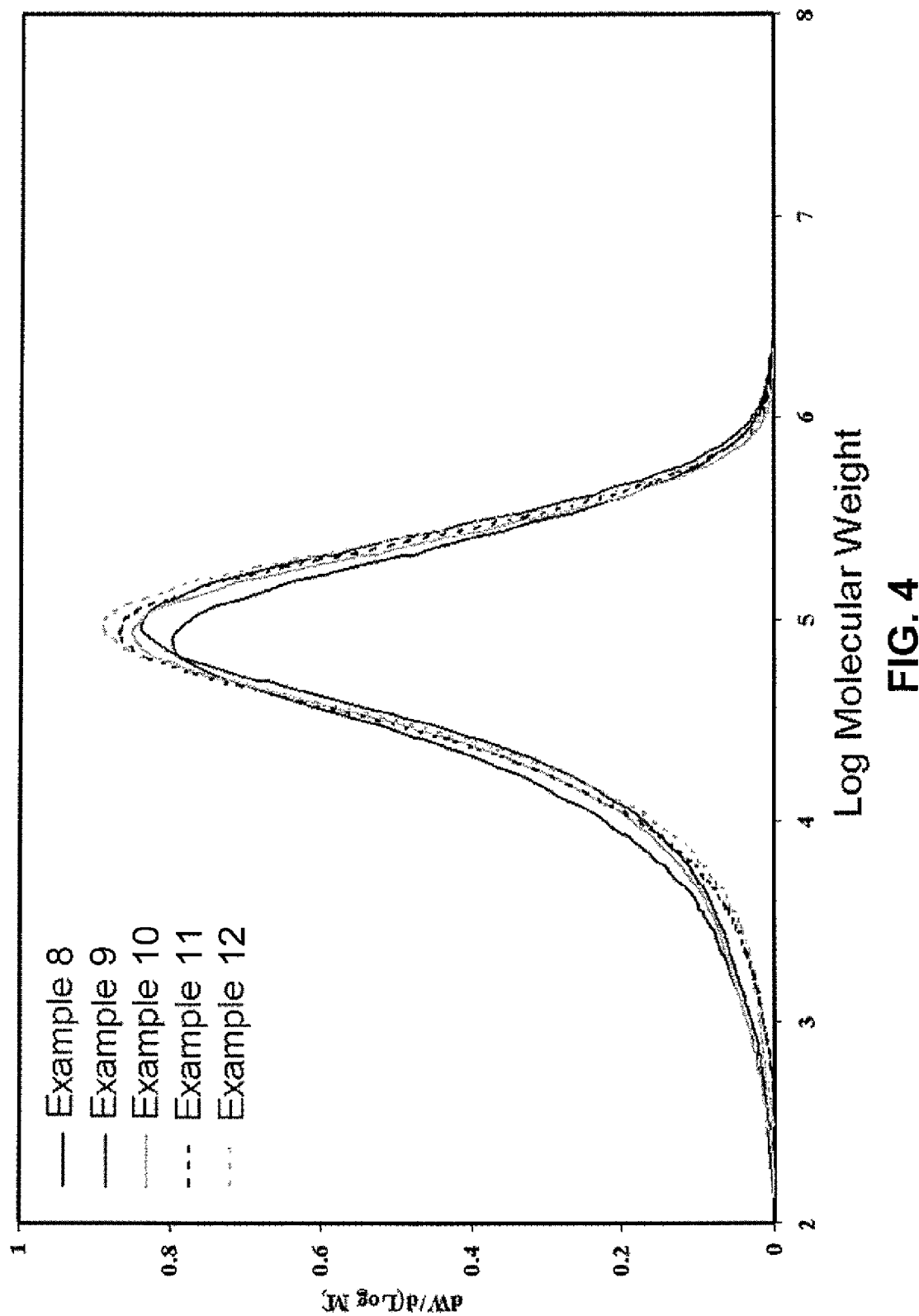
FIG. 4 presents a plot of the molecular weight distributions of the polymers of Examples 8-12.

Table II summaries the polymer properties of Examples 8-12. The column heading "g PE" indicates the amount of copolymer produced, in grams, from the one-hour polymerization at 90° C. and 450 psig ethylene pressure. FIG. 4 compares the molecular weight distributions of the polymers of Examples 8-12, and illustrates the impact of precontacting (the hybrid metallocene, the activator-support, and an olefin) on molecular weight distribution. As demonstrated in Table II and in FIG. 4, the selection of the $X^4$ ligand does not, by itself, have a dramatic effect on the molecular weight distribution. Examples 11-12, without precontacting, produced fairly narrow molecular weight distributions. While not wishing to be bound by theory, it is believed that this may be the result of using an indenyl group instead of a cyclopentadienyl group in the hybrid metallocene compound. Precontacting, as in Examples 8-10, produced broader molecular weight distributions than Examples 11-12, in which the catalyst components were not precontacted.

TABLE II

Polymer property comparison for Examples 8-12.

| Example | Precontacting | g PE | Mw | Mn | PDI |
|---|---|---|---|---|---|
| 8 | Yes | 176 | 108,000 | 15,200 | 7.1 |
| 9 | Yes | 153 | 125,000 | 16,300 | 7.6 |
| 10 | Yes | 176 | 108,000 | 15,500 | 7.0 |
| 11 | No | 169 | 119,000 | 24,700 | 4.8 |
| 12 | No | 208 | 117,000 | 27,100 | 4.3 |

We claim:

1. A catalyst composition comprising a contact product of at least one hybrid metallocene compound and at least one activator, wherein the at least one hybrid metallocene compound has the formula:

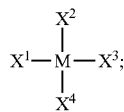

wherein:
M is Zr, Hf, or Ti;
$X^1$ and $X^2$ independently are a halide or a substituted or unsubstituted aliphatic, aromatic, or cyclic group, or a combination thereof;
$X^3$ is a substituted or unsubstituted cyclopentadienyl, indenyl, or fluorenyl group, any substituents on $X^3$ independently are a hydrogen atom or a substituted or unsubstituted aliphatic, aromatic, or cyclic group, or a combination thereof;
$X^4$ is —O—$R^A$, —NH—$R^A$, —PH—$R^A$, —S—$R^A$, or —$CR^B$=$NR^C$,
wherein:
$R^A$ is an aryl group substituted with at least one alkenyl substituent, any substituents on $R^A$ other than the at least one alkenyl substituent independently are a hydrogen atom or a substituted or unsubstituted alkyl, alkenyl, or alkoxy group; and
$R^B$ and $R^C$ independently are a hydrogen atom or a substituted or unsubstituted aliphatic, aromatic, or cyclic group, or a combination thereof.

2. The catalyst composition of claim 1, wherein $X^1$ and $X^2$ independently are a methyl group, a phenyl group, a benzyl group, or a halide.

3. The catalyst composition of claim 1, wherein each substituent on $X^3$ independently is a hydrogen atom, a methyl group, an ethyl group, a propyl group, an n-butyl group, a t-butyl group, or a hexyl group.

4. The catalyst composition of claim 1, wherein the at least one alkenyl substituent on $R^A$ is an ethenyl, a propenyl, or a butenyl.

5. The catalyst composition of claim 1, wherein each substituent on $R^A$ other than the at least one alkenyl substituent independently is a hydrogen atom, a methyl group, an ethyl group, a propyl group, an n-butyl group, a t-butyl group, a methoxy group, an ethoxy group, a propoxy group, or a butoxy group.

6. The catalyst composition of claim 1, wherein $X^4$ is —O—$R^A$.

7. The catalyst composition of claim 1, wherein $R^B$ and $R^C$ independently are a hydrogen atom, a methyl group, an ethyl group, a propyl group, an n-butyl group, a t-butyl group, a phenyl group, a benzyl group, a tolyl group, or a xylyl group.

8. The catalyst composition of claim 1, wherein the at least one activator is at least one activator-support comprising a solid oxide treated with an electron-withdrawing anion, wherein:
the solid oxide is silica, alumina, silica-alumina, aluminum phosphate, heteropolytungstates, titania, zirconia, magnesia, boria, zinc oxide, any mixed oxides thereof, or any mixture thereof; and
the electron-withdrawing anion is fluoride, chloride, bromide, phosphate, triflate, bisulfate, sulfate, or any combination thereof.

9. The catalyst composition of claim 8, wherein the at least one activator-support further comprises a metal or metal ion, and wherein the metal or metal ion is zinc, nickel, vanadium, silver, copper, gallium, tin, tungsten, molybdenum, or any combination thereof.

10. The catalyst composition of claim 1, wherein the at least one activator is at least one activator-support, and wherein the at least one activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

11. The catalyst composition of claim 1, wherein the at least one activator is at least one activator-support comprising a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

12. The catalyst composition of claim 1, further comprising at least one organoaluminum compound having the formula:

$$Al(X^5)_m(X^6)_{3-m};$$

wherein:
$X^5$ is a hydrocarbyl;
$X^6$ is an alkoxide or an aryloxide, a halide, or a hydride; and
m is from 1 to 3, inclusive.

13. The catalyst composition of claim 12, wherein the at least one organoaluminum compound is trimethylaluminum, triethylaluminum, tri-n-propylaluminum, diethylaluminum ethoxide, tri-n-butylaluminum, diisobutylaluminum hydride, triisobutylaluminum, diethylaluminum chloride, or any combination thereof.

14. The catalyst composition of claim 1, wherein the at least one activator is at least one aluminoxane compound, at least one organoboron or organoborate compound, at least one ionizing ionic compound, or any combination thereof.

15. A catalyst composition comprising a contact product of at least one hybrid metallocene compound and at least one activator, wherein the at least one hybrid metallocene compound is:

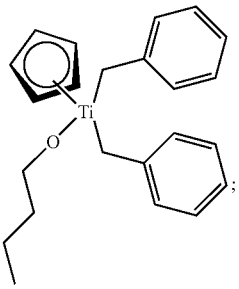

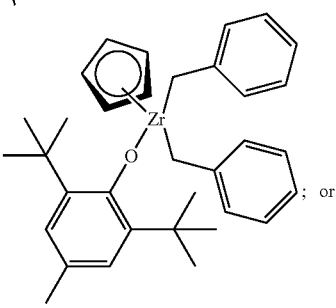

-continued

Indenyl(X⁴)Zr(CH₂Phenyl)₂; wherein X⁴ is

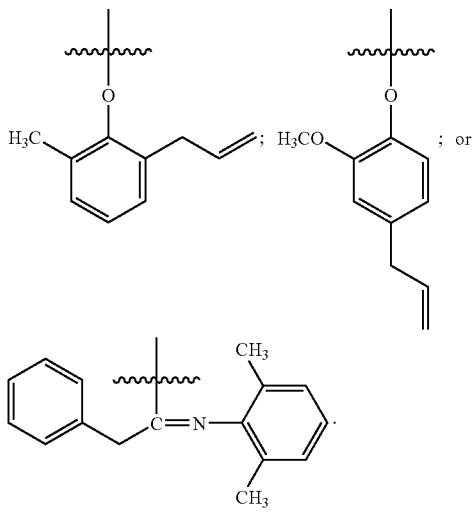

16. The catalyst composition of claim 15, wherein the at least one activator is at least one activator-support, at least one aluminoxane compound, at least one organoboron or organoborate compound, at least one ionizing ionic compound, or any combination thereof, wherein:
the at least one activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

17. The catalyst composition of claim 15, wherein the catalyst composition further comprises at least one organoaluminum compound selected from trimethylaluminum, triethylaluminum, tri-n-propylaluminum, diethylaluminum ethoxide, tri-n-butylaluminum, diisobutylaluminum hydride, triisobutylaluminum, and diethylaluminum chloride, or any combination thereof.

18. A process for polymerizing olefins in the presence of a catalyst composition, comprising contacting the catalyst composition with at least one olefin monomer and optionally at least one olefin comonomer under polymerization conditions to produce a polymer or copolymer, wherein the catalyst composition comprises a contact product of at least one hybrid metallocene compound and at least one activator,
wherein the at least one hybrid metallocene compound has the formula:

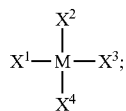 (I)

wherein:
M is Zr, Hf, or Ti;
X¹ and X² independently are a halide or a substituted or unsubstituted aliphatic, aromatic, or cyclic group, or a combination thereof;
X³ is a substituted or unsubstituted cyclopentadienyl, indenyl, or fluorenyl group, any substituents on X³ independently are a hydrogen atom or a substituted or unsubstituted aliphatic, aromatic, or cyclic group, or a combination thereof;

X⁴ is —O—R^A, —NH—R^A, —PH—R^A, —S—R^A, or —CR^B=NR^C,
wherein:
R^A is an aryl group substituted with at least one alkenyl substituent, any substituents on R^A other than the at least one alkenyl substituent independently are a hydrogen atom or a substituted or unsubstituted alkyl, alkenyl, or alkoxy group; and
R^B and R^C independently are a hydrogen atom or a substituted or unsubstituted aliphatic, aromatic, or cyclic group, or a combination thereof.

19. The process of claim 18, wherein the at least one activator is at least one activator-support, at least one aluminoxane compound, at least one organoboron or organoborate compound, at least one ionizing ionic compound, or any combination thereof, wherein:
the at least one activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

20. The process of claim 18, wherein the catalyst composition further comprises at least one organoaluminum compound selected from trimethylaluminum, triethylaluminum, tri-n-propylaluminum, diethylaluminum ethoxide, tri-n-butylaluminum, diisobutylaluminum hydride, triisobutylaluminum, and diethylaluminum chloride, or any combination thereof.

21. The process of claim 18, wherein the catalyst composition and the at least one olefin monomer and the optional at least one olefin comonomer are contacted in a gas phase reactor, a loop reactor, or a stirred tank reactor.

22. The process of claim 18, wherein at least one olefin monomer comprises ethylene, propylene, or styrene.

23. The process of claim 22, wherein the at least one olefin comonomer is 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, or styrene.

24. A compound having the formula:

Indenyl(X⁴)Zr(CH₂Phenyl)₂; wherein X⁴ is

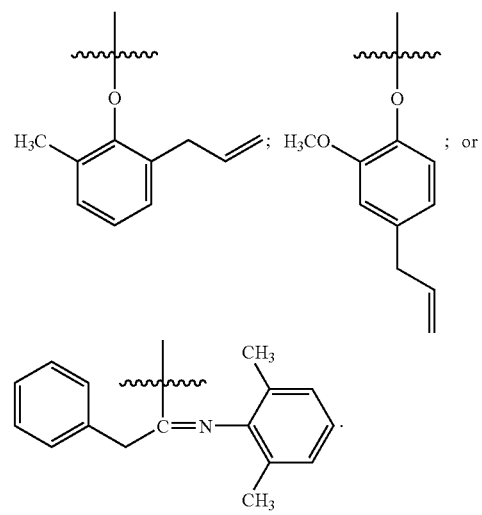

* * * * *